United States Patent
Chung et al.

(10) Patent No.: US 7,680,131 B2
(45) Date of Patent: Mar. 16, 2010

(54) SYSTEM AND METHOD FOR INTERWORKING SCFS AND PROTOCOLS IN OPEN SERVICE GATEWAY

(75) Inventors: Ki Sook Chung, Daejeon (KR); Yeon Heon Ku, Daejeon (KR); Sang Hyun Kim, Daejeon (KR); Young Il Choi, Daejeon (KR); Byung Sun Lee, Daejeon (KR); Kyung Pyo Jun, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1192 days.

(21) Appl. No.: 11/223,542

(22) Filed: Sep. 9, 2005

(65) Prior Publication Data

US 2006/0133420 A1 Jun. 22, 2006

(30) Foreign Application Priority Data

Dec. 20, 2004 (KR) .............. 10-2004-0108980

(51) Int. Cl.
*H04L 12/56* (2006.01)
*H04J 3/22* (2006.01)
*G06F 15/16* (2006.01)

(52) U.S. Cl. .............. 370/400; 370/401; 370/466; 709/228

(58) Field of Classification Search ......... 370/400–402; 709/217–229
See application file for complete search history.

(56) References Cited

U.S. PATENT DOCUMENTS

| | | | | |
|---|---|---|---|---|
| 6,415,151 | B1 * | 7/2002 | Kreppel ............... | 455/445 |
| 6,856,676 | B1 * | 2/2005 | Pirot et al. ............ | 379/201.01 |
| 6,947,541 | B2 * | 9/2005 | Tuunanen ............. | 379/221.08 |
| 6,980,639 | B2 * | 12/2005 | Park ................... | 379/230 |
| 7,272,133 | B2 * | 9/2007 | Valin et al. .......... | 370/352 |
| 2003/0087633 | A1 * | 5/2003 | Yoon .................. | 455/418 |
| 2003/0126584 | A1 * | 7/2003 | Creamer et al. ..... | 717/109 |
| 2003/0206562 | A1 * | 11/2003 | Yi ...................... | 370/522 |

(Continued)

FOREIGN PATENT DOCUMENTS

KR   1020010001133 A   1/2001

(Continued)

OTHER PUBLICATIONS

Chaniotakis et al., External Service Provision in Telecommunications Networks Using Open Interfaces, 2003, Elsevier B.V., Computer Communication 27 (2004) 1-12, 0140-3664/03, pp. 1-12.*

(Continued)

*Primary Examiner*—Tri H Phan
(74) *Attorney, Agent, or Firm*—Blakely, Sokoloff, Taylor & Zafman

(57) ABSTRACT

Provided are a system and method for interworking Service Capability Features (SCFs) and protocols in an open service gateway. The system includes service capability features that generate and process various protocol messages, and a protocol stack that enables an interwork with a communications network. The protocol stack includes: one or more units that maintain various protocols, a unit that performs data connection and transmits and processes messages, and a unit that manages the various protocols. In the protocol stack, protocol identifiers that differentiate the protocols from one another, and message identifiers that differentiate service capability features from one another are stored in the unit that manages the various protocols.

13 Claims, 4 Drawing Sheets

U.S. PATENT DOCUMENTS

2004/0242186 A1* 12/2004 Thanh et al. ................ 455/403
2005/0111650 A1* 5/2005 Baratz et al. ........... 379/221.08

FOREIGN PATENT DOCUMENTS

| KR | 1020030012507 A | 2/2003 |
|----|-----------------|--------|
| KR | 2003-0068105    | 8/2003 |
| KR | 10-2004-0001247 | 1/2004 |

OTHER PUBLICATIONS

Chung et al., An Interworking Mechanism between SCFs and Protocols in the Open Service Gateway, Feb. 2006, IEEE, 01-4244-0574, pp. 1-5.*

* cited by examiner

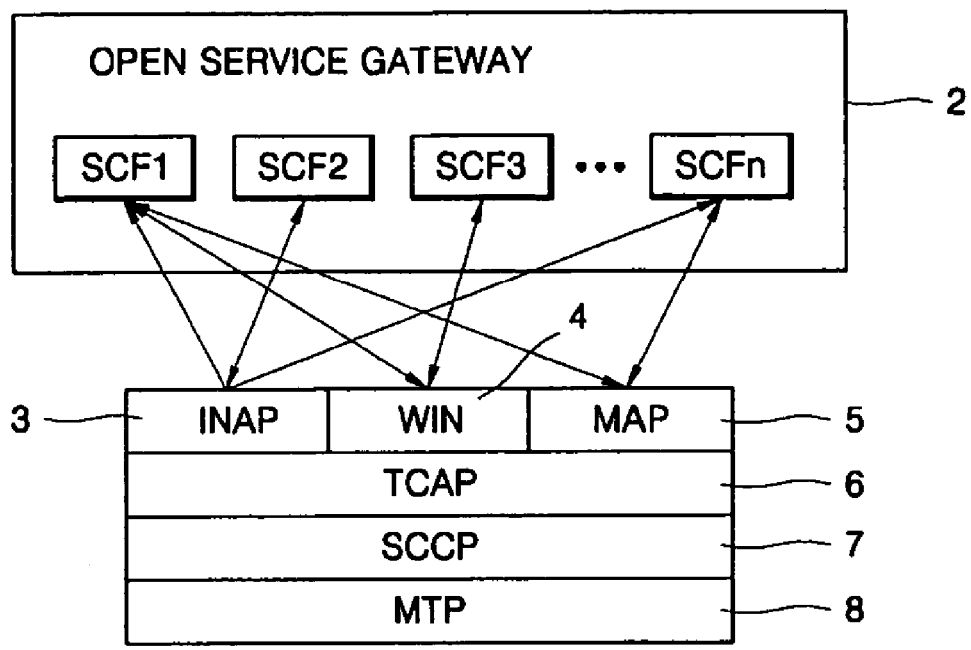

SYSTEM AND METHOD FOR INTERWORKING SCFS AND PROTOCOLS IN OPEN SERVICE GATEWAY

CROSS-REFERENCE TO RELATED PATENT APPLICATIONS

This application claims the priority of Korean Patent Application No. 10-2004-0108980, filed on Dec. 20, 2004, in the Korean Intellectual Property Office, the disclosure of which are incorporated herein in its entirety by reference.

BACKGROUND OF THE INVENTION

1. Field of the Invention

The present invention relates to a system and method for interworking Service Capability Features (SCFs) and protocols in an open service gateway.

2. Description of the Related Art

An open service gateway is indispensable to a next-generation open network that enables a service to be provided using a standard open Application Program Interface (API) regardless of whether the network is a wired network, a wireless network, or an Internet Protocol (IP) network. The open service gateway abstracts various network control functions such as call control, call monitoring, charging, providing of location information, and providing of presence information, and provides the result of abstraction as SCFs. To provide the result of abstraction as the SCFs, the SCFs must be interworked with protocols. Systems for providing communications network services have recently been developed to operate dependently upon a single specific network. In contrast, the open service gateway system is designed to provide communications services via an identical open API in various types of networks, not a single network.

The open service gateway is capable of abstracting and providing functions of various networks such as a wireless communications network, a wire communications network, and an IP network. Therefore, an application service provider can provide services using the open API without special knowledge of a network. An interwork with each communications network requires a protocol stack that matches each communications network and can process a message. There are representative protocols such as a Wireless Intelligent Network (WIN), a Mobile Application Part (MAP), an Intelligent Network Application Part (INAP), a Camel Application Part (CAP), and a Session Initiation Protocol (SIP). All the protocols, except the SIP that is an Internet protocol, are application parts of an SS No. 7 protocol stack. Each SCF provided from the open service gateway interworks with some or all of the above protocols, and therefore, it is necessary to detect and transmit an SCF matching a protocol message.

SUMMARY OF THE INVENTION

The present invention provides a system and method for effectively mapping protocols to adequate Service Capability Features (SCFs) by processing protocol messages according to a data structure for distribution of protocols.

According to one aspect of the present invention, there is provided a system for interworking service capability features and protocols in an open service gateway including: the service capability features generating and processing various protocol messages; and a protocol stack enabling an interwork with a communications network, wherein the protocol stack includes protocol identifiers which differentiate protocols from one another, and message identifiers which differentiate the service capability features from one another.

According to another aspect of the present invention, there is provided a method of interworking service capability features and protocols in an open service gateway including: (a) requesting a service to be provided from an open application server to a service capability feature in the open service gateway; (b) generating a protocol message required to accomplish the service, and encoding the protocol message to include a message identifier which differentiates the service capability feature from other service capability features; (c) transmitting the encoded protocol message to a unit for maintaining a protocol corresponding to the service capability feature; and (d) allocating a protocol identifier to the transmitted protocol message, the protocol identifier differentiating protocols from one another.

According to yet another aspect of the present invention, there is provided a method of interworking service capability features and protocols in an open service gateway including: (a) receiving a protocol message which includes a protocol identifier and a message identifier, the protocol identifier differentiating protocols from one another and the message identifier differentiating service capability features from one another; (b) decoding the received protocol message; (c) checking the protocol identifier included in the protocol message, and transmitting the protocol message to a unit for maintaining a protocol corresponding to the protocol identifier; and (d) checking the message identifier included in the protocol message, and providing the protocol message to a corresponding service capability feature.

Accordingly, it is possible to effectively distribute protocol messages to SCFs.

BRIEF DESCRIPTION OF THE DRAWINGS

The above and other aspects and advantages of the present invention will become more apparent by describing in detail exemplary embodiments thereof with reference to the attached drawings in which:

FIG. 2 is a block diagram of an interwork between Service Capability Features (SCFs) in the open service gateway of FIG. 1 with an SS No. 7 protocol stack according to an embodiment of the present invention;

FIG. 3 is an information table required for distribution of protocol messages according to an embodiment of the present invention;

DETAILED DESCRIPTION OF THE INVENTION

Hereinafter, exemplary embodiments of a system and method for interworking Service Capability Features (SCFs) and protocols in an open service gateway according to the present invention will be described in detail with reference to the accompanying drawings.

Figure 1:
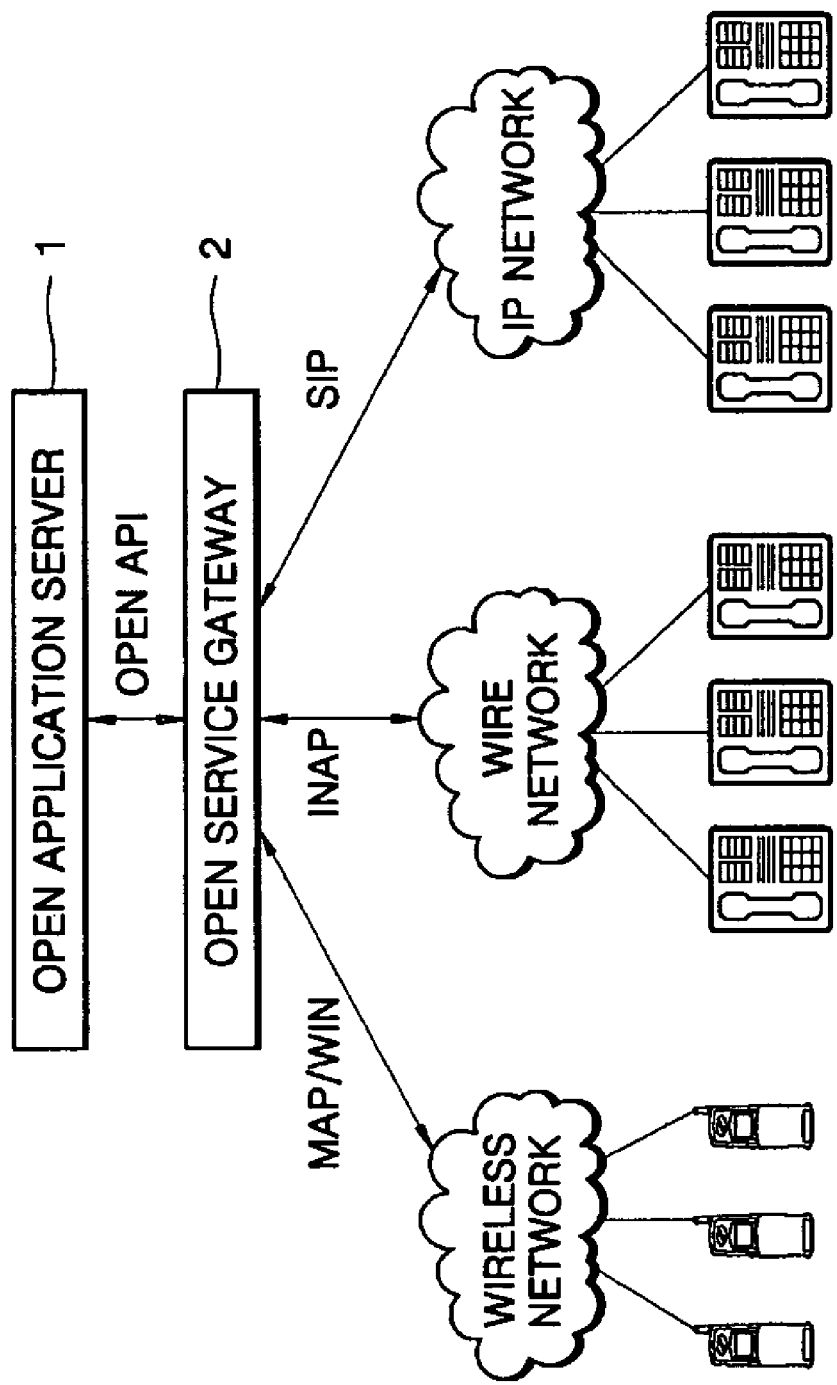
FIG. 1 illustrates a network structure in which a service is provided using an open service gateway according to an embodiment of the present invention.

FIG. 1 illustrates a network structure in which an open service gateway 2 abstracts functions of each network and provides the result of abstraction as an open Application Program Interface (API), and an open application server 1 for application service logic provides a service through the API.

Referring to FIG. 1, the open service gateway 2 provides a mobile network protocol, a wired network protocol, and an Internet Protocol (IP) network protocol for interworking with each network. The network structure of FIG. 1 enables an application service provider to provide application services without special knowledge of network, irrespective of the type of network.

FIG. 2 is a block diagram of an interwork between SCFs in the open service gateway 2 and an SS No. 7 protocol stack according to an embodiment of the present invention. Referring to FIG. 2, the open service gateway 2 abstracts network functions and provides the result of abstraction as the SCFs. Each SCF provides functions such as call control, call monitoring, location information management, presence information management, and terminal state management. Each SCF must interwork with a network protocol required to perform a function to be provided.

FIG. 2 illustrates the SS No. 7 protocol stack that supports a wire/wireless network protocol, but the present invention is not limited to the SS No. 7 protocol stack. The SS No. 7 protocol stack includes an Intelligent Network Application Part (INAP) 3, a Wireless Intelligent Network (WIN) 4, a Mobile Application Part (MAP) 5, a Transaction Capability Application Part (TCAP) 6, a Signaling Connection Control Part (SCCP) 7, and a Message Transfer Part (MTP) 8 of levels 1 through 3. The MTP 8 performs connection of a signal data, and transmits and processes a signal message. The SCCP 7 enables logic signal connection in a network to be controlled, and the signal data to be transmitted. The TCAP 6 is an SCCP user interface. The INAP 3, the WIN 4, and the MAP 5 are TCAP user interfaces, and interwork directly with the SCFs. In the SS No. 7 protocol stack, the SCCP 7 manages the INAP 3, the WIN 4, and the MAP 5, and a unique SubSystem Number (SSN) is allocated to each of the INAP 3, the WIN 4, and the MAP 5 so that they can be distinguished from other protocols. Also, the SCFs of the open service gateway 2 use a Message Identifier (MID) that falls within the predetermined range of MID, thereby enabling protocol messages to be transmitted to the corresponding SCFs.

FIG. 3 is an information table required for protocol message distribution according to an embodiment of the present invention. Referring to FIG. 3, the INAP 3, the WIN 4, and the MAP 5 which are user parts of the TCAP 6 are differentiated from one another using different SSNs, and MIDs of different ranges are allocated to SCFs, respectively.

The SSNs are defined by the SCCP 7, and protocols are differentiated from one another using different SSNs corresponding to the functions of user parts of the SCCP 7. Referring to FIG. 3, identifiers 0×31, 0×32, and 0×33 are allocated to the INAP 3, the WIN 4, and the MAP 5, respectively, thereby differentiating protocols from one another in an open service gateway supporting multiple protocols.

When receiving of signal messages from the open application server 1 of FIG. 1, the SCCP 7 distributes the signal messages to sub-systems which maintain corresponding protocols in a gateway, of the open service gateway according the SSNs. When a protocol interworks with several SCFs, an SCF that transmits the signal message must be detected. In this case, the SCF can be detected by checking the range of MID allocated to each SCF. In other words, it is possible to distribute the signal messages to the adequate sub-systems using the SSN and the MID of the protocol messages used by the SCCP 7.

Figure 4:
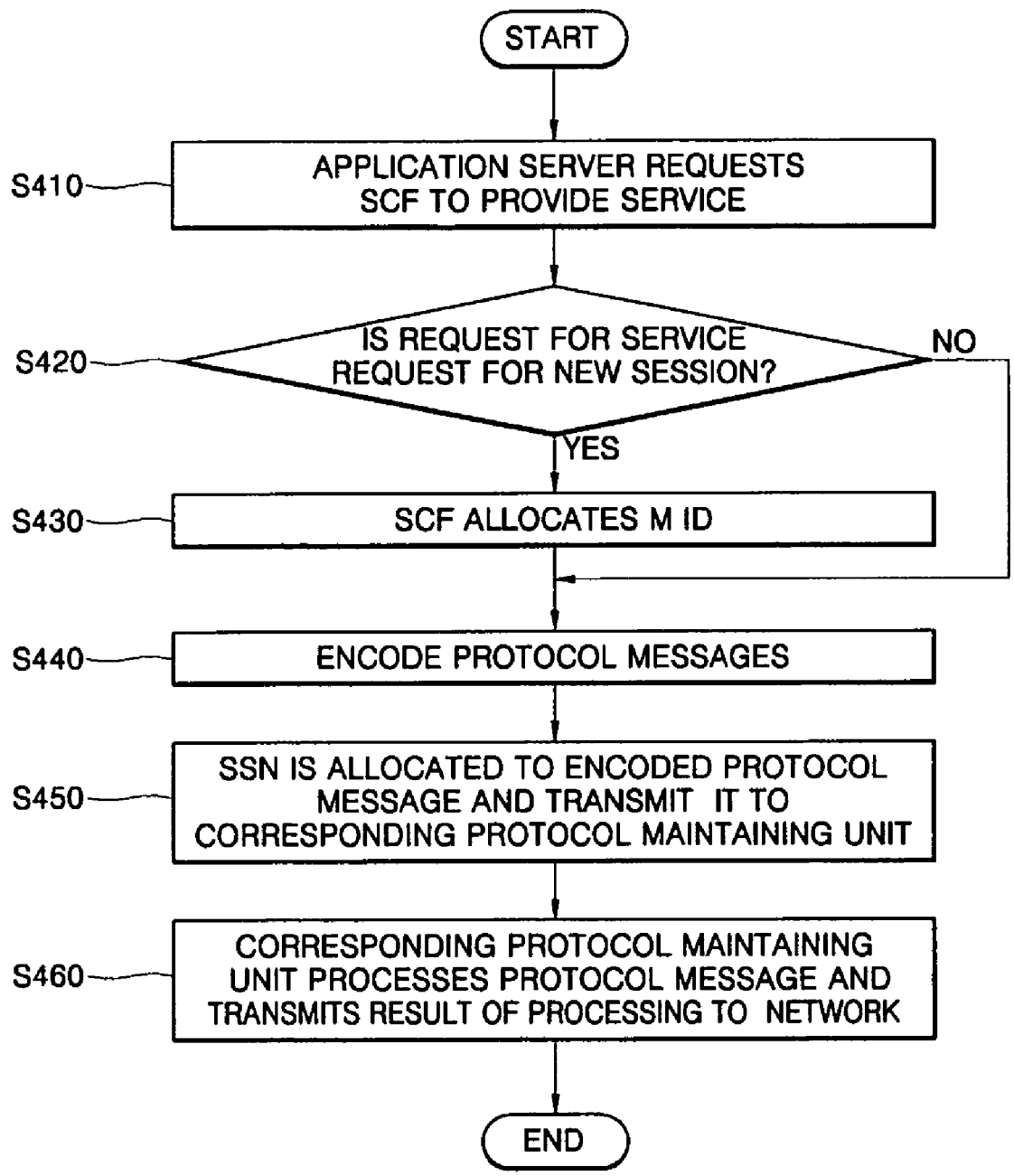
FIG. 4 is a flowchart of a method of processing a protocol service request transmitted from an application server in an open service gateway according to an embodiment of the present invention.
Figure 5:
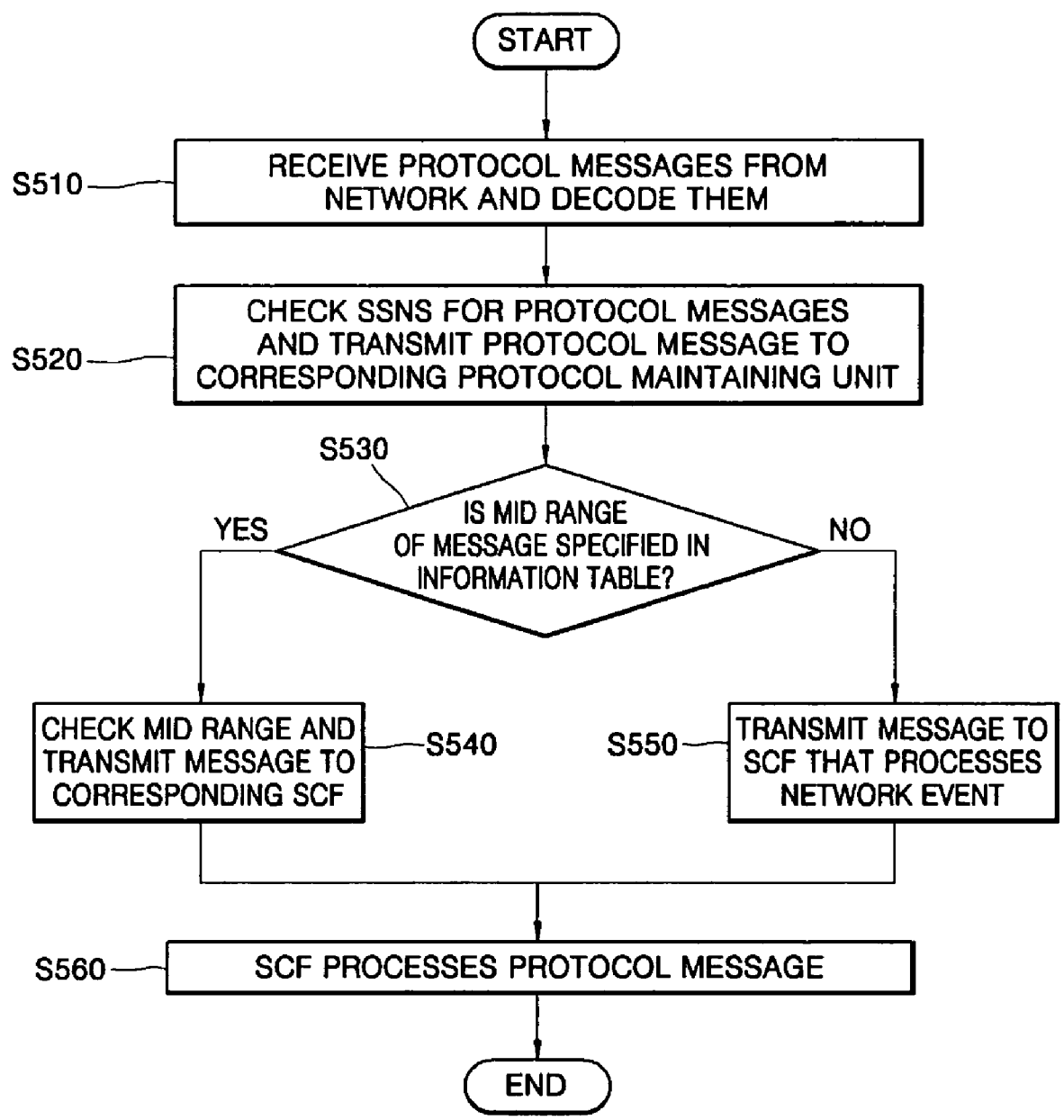
FIG. 5 is a flowchart of a method of distributing protocol messages received via a communications network to SCFs in an open service gateway according to an embodiment of the present invention.

FIG. 4 is a flowchart of a method in which a service capability feature (SCF) receives a request from the open application server 1 of FIG. 1 and processes it using a related protocol according to an embodiment of the present invention. Conversely, FIG. 5 is a flowchart of a method of transmitting a protocol message received via a network to a corresponding SCF according to an embodiment of the present invention.

Referring to FIG. 4, the open application server 1 of FIG. 1 requests the SCF to provide a protocol-related service, e.g., a call control service, an event monitoring service, and so on, through an open API (S410).

Next, it is determined whether the request for the service is a request for the start of a new session or a request for a previous session (S420). If the request for the service is the request for the previous session, previously allocated MID is used. If the request for the service is the request for a new session, new MID is allocated (S430). The new MID is selected within the range of MID matching the type of the SCF according to the information table illustrated in FIG. 3. Next, a protocol message required to accomplish the service in the SCF is generated, and encoded to include the MID (S440). Next, SSN is allocated to the encoded message and the encoded message is transmitted to a sub-system which maintains a related protocol (S450).

If the sub-system sends the encoded message by a predetermined protocol to the TCAP 6 of FIG. 2, the TCAP 6 maps it to dialogue ID and transmits the result of mapping to the SCCP 7. The SCCP 7 checks the range of the dialogue ID of the encoded message, maps the encoded message to the SSN, encodes the SSN, and sends the encoded message to a signal point of other station or server (S460).

FIG. 5 is a flowchart of a method of distributing protocol messages that are generated by a communications network as reply messages for protocol requests or report messages for the result of network event monitoring, to corresponding SCFs in the open service gateway 2 of FIG. 1, according to an embodiment of the present invention.

Referring to FIG. 5, when receiving of the protocol messages, the SCCP 7 of FIG. 2 decodes or encodes them in an SS No. 7 protocol stack (S510). Next, the SCCP 7 checks an SSN corresponding to each protocol, and the TCAP 6 converts the SSNs into dialogue ID and classifies and sends the protocol messages to the INAP 3, the WIN 4, or the MAP 5 (S520).

Each sub-system checks the MID included in each protocol message (S530), and detects a related SCF and transmits the protocol message using the information table of FIG. 3 (S540). If there is a protocol message, the range of MID of which is not specified in the information table, the protocol message is a protocol message describing the result of network message monitoring, not a replay message to a request for a protocol made in an SCF, and therefore, the protocol message is transmitted to an SCF that processes a network event (S550). The protocol messages transmitted in operation S540 are distributed to and processed in the corresponding SCFs (S560).

The present invention can be embodied as a computer readable code in a computer readable medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as a computer readable code in the distributed system.

In a system and method for interworking Service Capability Features (SCFs) and protocols in an open service gateway according to the present invention, the protocol messages received via a communications network to corresponding SCFs can be effectively distributed by defining information required for protocol distribution in the open service gateway, generating and processing a protocol message in a related SCF when a request for service is transmitted from an open application server.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A system for interworking service capability features and protocols in an open service gateway, the system comprising:
   a computer including:
   the service capability features generating and processing various protocol messages; and
   a protocol stack enabling an interwork between the open service gateway and a plurality of communications networks of different types, wherein the protocol stack includes protocol identifiers which differentiate the protocols from one another, and message identifiers which differentiate the service capability features from one another, and wherein the service capability features have different ranges of the message identifier.

2. The system of claim 1, wherein the protocol stack comprises:
   one or more units maintaining various types of protocols;
   a first unit performing data connection, and transmitting and processing a message; and
   a second unit managing the various types of protocols,
   wherein the protocol identifiers and the message identifiers are stored in the second unit managing the various types of protocols.

3. The system of claim 2, wherein the protocol stack is an SS No. 7 protocol stack,
   the first unit performing data connection, and transmitting and processing messages is a message transfer part, and
   the second unit managing the various types of protocols is a signal connection control part.

4. The system of claim 1, wherein the protocol identifiers are subsystem numbers, and
   the message identifiers of different ranges are allocated to the service capability features.

5. The system of claim 4, wherein the protocol messages are distributed to corresponding the unit maintaining protocols using the subsystem numbers, and
   the service capability features are detected and distributed using the corresponding message identifiers.

6. A method of interworking service capability features and protocols in an open service gateway, the method comprising:
   (a) requesting a service by a computer to be provided from an open application server to a service capability feature in the open service gateway, wherein a protocol stack enables the open service gateway to interface with a plurality of communications networks of different types, the protocol stack including a message identifier and a protocol identifier, the service capability features having different ranges of the message identifier;
   (b) generating a protocol message required to accomplish the service, and encoding the protocol message to include the message identifier which differentiates the service capability feature from other service capability features;
   (c) transmitting the encoded protocol message to a unit for maintaining a protocol corresponding to the service capability features; and
   (d) allocating the protocol identifier to the transmitted protocol message, the protocol identifier differentiating the protocols from one another.

7. The method of claim 6, wherein in the step (a), when a service request is a new session, a corresponding message identifier to the service capability feature is allocated.

8. The method of claim 6, wherein the ranges of message identifiers allocated to the service capability features are different from one another.

9. The method of claim 6, wherein the protocol identifier is a number of sub-system which maintains the corresponding protocol.

10. A computer recording medium having embodied thereon a computer program for the method of claim 6.

11. A method of interworking service capability features and protocols in an open service gateway, the method comprising:
   (a) receiving a protocol message which includes a protocol identifier and a message identifier, the protocol identifier differentiating the protocols from one another and the message identifier differentiating the service capability features from one another, the service capability features of the open service gateway interfacing with a plurality of communication networks of different types through a protocol stack, wherein the service capability features have different ranges of the message identifier;
   (b) decoding the received protocol message by a computer;
   (c) checking the protocol identifier included in the protocol message, and transmitting the protocol message to a unit for maintaining a protocol corresponding to the protocol identifier; and
   (d) checking the message identifier included in the protocol message, and providing the protocol message to a corresponding service capability feature.

12. The method of claim 11, wherein if it is determined in the step (d) that the protocol message includes the message identifier, the protocol message is provided to a network event processing service capability feature.

13. The method of claim 11, wherein the protocol identifier is a number of sub-system which maintains the corresponding protocol.

* * * * *